(12) United States Patent
Au et al.

(10) Patent No.: US 11,140,234 B2
(45) Date of Patent: *Oct. 5, 2021

(54) CONTROLLING USAGES OF CHANNELS OF A USER EXPERIENCE ECOSYSTEM

(71) Applicant: Adobe Inc., San Jose, CA (US)

(72) Inventors: Stephanie Au, San Francisco, CA (US); Peter Krmpotic, San Francisco, CA (US); John Costello, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/845,971

(22) Filed: Apr. 10, 2020

(65) Prior Publication Data

US 2020/0244754 A1 Jul. 30, 2020

Related U.S. Application Data

(63) Continuation of application No. 15/602,984, filed on May 23, 2017, now Pat. No. 10,659,546.

(51) Int. Cl.
*H04L 29/08* (2006.01)
*G06Q 50/00* (2012.01)
*G06Q 30/02* (2012.01)

(52) U.S. Cl.
CPC ......... *H04L 67/26* (2013.01); *G06Q 30/0277* (2013.01); *G06Q 50/01* (2013.01);
(Continued)

(58) Field of Classification Search
CPC ......... H04L 67/26; H04L 67/02; H04L 67/22; H04L 67/306; G06Q 30/0277; G06Q 50/01

See application file for complete search history.

(56) References Cited

U.S. PATENT DOCUMENTS 8,219,071 B2 7/2012 Kokubo
8,924,942 B1 12/2014 Makuch
(Continued)

OTHER PUBLICATIONS

Notice of Allowance from related U.S. Appl. No. 15/602,984 dated Jan. 16, 2020, 8 pages.

(Continued)

*Primary Examiner* — Philip J Chea
*Assistant Examiner* — Robert B McAdams
(74) *Attorney, Agent, or Firm* — Kilpatrick Townsend & Stockton LLP

(57) ABSTRACT

Various embodiments describe controlling usages of channels of a user experience ecosystem. A computer system provides a user interface to a computing device, generates data entries based on user interactions with the user interface, and stores the data entries in a data store. The data entries identify the channels and specify dependencies between the usages of the channels. The computer system adds, to the data store, identifiers of storage locations of content. The computer system provides, to channel systems, access to the data entries and the identifiers of the storage locations in the data store. A usage of a channel by a channel system includes a content publication based on the data entries and the identifiers of the storage locations. The usage of this channel is coordinated with a usage of a different channel by a different channel system based on the dependencies specified in the data entries.

20 Claims, 7 Drawing Sheets

(52) U.S. Cl.
CPC .............. *H04L 67/02* (2013.01); *H04L 67/22* (2013.01); *H04L 67/306* (2013.01)

(56) References Cited

U.S. PATENT DOCUMENTS

| | | |
|---|---|---|
| 8,935,393 B1 | 1/2015 | Jackson |
| 9,461,972 B1 * | 10/2016 | Mehta .................... H04L 63/10 |
| 9,952,748 B1 | 4/2018 | Lewis |
| 10,004,986 B1 | 6/2018 | Shavell |
| 2013/0014223 A1 | 1/2013 | Bhatia |
| 2014/0298194 A1 | 10/2014 | Prasad |
| 2016/0180408 A1 * | 6/2016 | Memarian .......... G06Q 30/0276 |
| | | 705/14.72 |

OTHER PUBLICATIONS

Non Final Office Action from related U.S. Appl. No. 15/602,984 dated Aug. 8, 2019 6 pages.

* cited by examiner

| Campaign ID 410 | Channel ID 420 | Usage 430 | Dependency 440 | | Content Descriptor 450 | Content ID 460 |
|---|---|---|---|---|---|---|
| Acme | Web Page | Insert Web Ad | | If time = day X | Existing | Ad 1 URL |
| | Web Page | | | If time = Day Y | Static ad, New beach scene with two children | Ad 2 URL |
| | Web page | | | If User Interaction= three visits | Dynamic ad, Flashing 30% discount | Ad 3 URL |
| | Web page | Insert banner | | If user posts on social media | Welcome user back, show image of product | Banner URL |

FIG. 4

CONTROLLING USAGES OF CHANNELS OF A USER EXPERIENCE ECOSYSTEM

CROSS-REFERENCE TO RELATED APPLICATIONS

This application is a continuation application of application Ser. No. 15/602,984, filed May 23, 2017, now allowed, which is incorporated herein by reference in its entirety.

TECHNICAL FIELD

The application generally relates to controlling usages of channels of a user experience ecosystem. In an example, data entries are generated in a machine readable format and distributed to systems that control the channels, thereby automating and synchronizing the usages.

BACKGROUND

Typically, a user of a computing device has access to electronic content over multiple types of communication channels on a daily basis. These channels form an ecosystem in which the user interacts with the electronic content via the computing device. For example, the user device accesses news available from a particular web page in the morning, downloads emails throughout the day, and posts photos on a social media platform in the evening. Content-providing entities can augment this user experience by delivering targeted content over these communication channels to the user device. For example, while the news is displayed to the user, an advertisement can be inserted in the web page about a product or service of the entity.

The proper use of the channels within the ecosystem can be critical to providing a desired used experience. The design and operation of current ecosystems include multiple design systems and operation systems that are fragmented. The entity operates many design systems to develop bounds about the usages of the channels of an ecosystem. Operators of the channels use the operation systems to control the channels, where each channel is typically controlled by a specific operation system. However, no integration or standardized interfaces exist between the design systems themselves, the operation systems themselves, and between the design systems and the operation systems. Hence, even if the ecosystem is properly designed, its deployment across the operation systems can be challenging. Once deployed, the synchronization of how the channels should be used across the operation systems and the relevant content to be provided in each channel can also be challenging. Further, no feedback loop exists from the operation systems to the design systems to further refine various aspects of the ecosystem's design based on its actual operations.

SUMMARY

Embodiments of the present disclosure include controlling usages of channels that form a user experience ecosystem. In an example, data entries are generated based on user interactions received by a canvas of a user interface and are stored in a data store in a machine readable format. The data entries identify the channels and specify dependencies between the usages of channels that are available for content publications. A content system generates content based on the stored data entries and stores the content at storage locations. The data entries are further updated to include identifiers of the storage locations.

The data entries in the machine readable format and the identifiers of the content's storage locations are provided to a channel system, which is responsible for the usage of a channel. Providing the data entries and identifiers to the channel system enables the channel system to control how content should be provided to end users over the channel. For instance, the channel system publishes content over a channel based on the data entries and the identifiers of the storage locations. Furthermore, usages of different channels by different channel systems is coordinated based on the dependencies specified in the data entries.

Metrics are collected that track interactions of end users with the channels and/or content provided over the channels. The tracking, which can be performed per end user and per channel, associates the metrics with the user experience ecosystem, thereby allowing measurements of the interaction at various granularity levels and refinements of the usages of the channels across the user experience ecosystem.

These illustrative examples are mentioned not to limit or define the disclosure, but to provide examples to aid understanding thereof. Additional embodiments and examples are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

FIG. 4 illustrates examples of data entries in a data store, where the data entries specify usages of channels of a user experience ecosystem, according to embodiments of the present disclosure.

DETAILED DESCRIPTION

Figure 1:
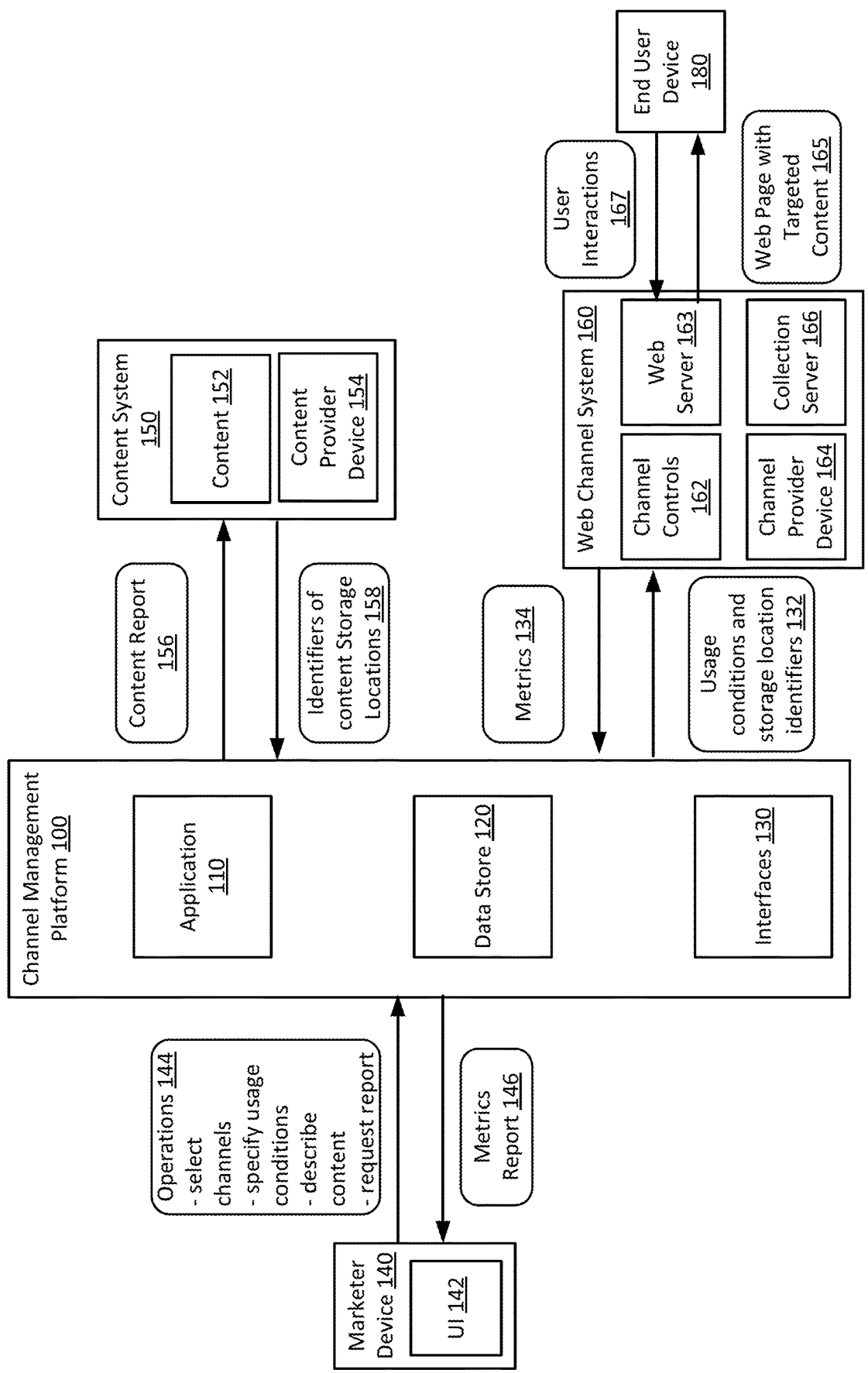
FIG. 1 illustrates an example of a channel management platform for controlling usage of channels of a user experience ecosystem, according to embodiments of the present disclosure.

Embodiments of the present disclosure are directed to, among other things, controlling usages of channels of a user experience ecosystem, which is used by an entity to provide targeted content to users over various channels. The embodiments involve a channel management platform that enables the entity to design a far superior user experience ecosystem for providing the targeted content, relative to existing systems.

For example, the channel management platform performs operations that define which channels should belong to the ecosystem, how each of the channels should be used and conditions for using the channels, and the type of metrics to be collected for the channels. The operations also describe the content that should be targeted via each channel. The channel management platform generates and stores data entries that capture these usages, conditions, desired metrics, and content descriptions, and associates the data entries with the user experience ecosystem. The data entries are in a machine-readable format compatible with downstream systems such as content systems and channel systems. A content system accesses the content descriptions from the data entries and generates the relevant content. A channel system controls channel usage including, for example, the publication of the relevant content using the data entries. Furthermore, the desired metrics, as defined in the data entries, are collected and associated with the channels and the user experience ecosystem. Based on these associations, the channel management platform tracks the success of each channel and the success across the user experience ecosystem.

In an illustrative example, a user experience ecosystem includes a new marketing campaign for a product. A marketer desires to inform users about the product. To do so, the marketer operates a computing device to access a user interface of the channel management platform. The user interface enables drag-and-drop operations to select and add available channels to a canvas, edit operations on the canvas to define conditions for using the selected channels, input operations on the canvas to describe the content about the product in each of the channels, and input operations to specify the responsible operators. The entity then selects a web channel, an email channel, and a social media channel as three communication channels of the marketing campaign. The entity specifies that, upon a first visit to a web site, an informational advertisement about the product should be displayed and should show an image of the product and that, upon, a second visit, a discount advertisement should be displayed with a flashing colors. It also specifies that a social media post about the features and price of the product should be provided and conditions sending an email about store locations of the new product only if a positive review of the social media post is detected. The channel management platform generates and stores data entries based on the input at the user interface. The data entries identify the three channels, the conditions about their usages in conditional expressions (e.g., "if-then" statements), and the descriptions of the content.

Once the targeted content (e.g., advertisements, social media posts, and email contents) becomes available from storage locations, the channel management platform further updates the data entries to include the storage locations. The operators of the channels are then notified of the data entries. In turn, each operator uses a computing device to direct the relevant channel system to the data store. The channel system accesses the data store, identifies the applicable data entries to its corresponding channel, and configures the parameters of the channel based on the applicable conditional expressions. Collection servers track user interactions with the channels (e.g., a click on an advertisement, a review of the social media post, an opening of an email) per user and per channel and are associated with the marketing campaign. The channel management platform receives the tracked user interactions and updates states about the behavior of each user across the marketing campaign. The channel systems control the channel usages based on these states. For instance, if a state indicates that a user has positively reviewed the social media post, an email system generates and sends an email message about the store locations to an email address of the user.

In comparison, existing systems do not provide this type of control to a marketer for designing a marketing campaign and coordinating how the different channels should be used. For example, in existing systems, it is common to use one set of tools to design the marketing campaign and a completely different set of tools to operate the marketing campaign. Such sets can be incompatible and are typically fragmented. For instance, the marketer user a PowePoint presentation (or some other presentation tool) to define aspects of the marketing campaign, then uses an email tool to send the presentation to a content provider. To launch the marketing campaign, the marketer contacts each channel operator, sets up meeting, and exchanges documentation about the desired channel use. If changes the channel uses need to occur, this effort is repeated and can delay when those changes are implemented.

The embodiments of the present disclosure provide multiple improvements and advantages over such existing systems. For example, the channel management platform provides a user-friendly tool for generating machine-readable instructions that control downstream systems, and allows continuous and cohesive monitoring and refinement of the channels usages. Such technical benefits can be better understood when explained in the context of the life cycle of a marketing campaign (or, more generally, a user experience ecosystem). The life cycle includes a design phase and an operation phase.

In the design phase, the channel management platform includes a user interface that is intuitive and that can be shared across multiple users. On one hand, none of the users need to be familiar with coding. The intuitive user interface allows the users to cooperate and articulate a complex user experience ecosystem with usage conditions between channels and within each channel and with descriptions about the relevant content that should be provided over each channel. On the other hand, machine-readable instructions are generated and stored in response to the user interactions with the user interface. Such instructions follow a common format that is usable across the various downstream systems and need not be interpreted and modified by a human operator. Hence, the output of the channel management platform allows a seamless transition from the design phase to the operation phase, unlike existing systems.

In the operation phase, the downstream systems, including the channel systems, consume the data entries. The dependencies defined by the data entries coordinate the operations of each system locally to that system and collectively across the systems. Any tweaks to the usages of the channels (e.g., a change to a usage condition) can be automatically and immediately (e.g., in real-time) propagated to the system. This ensures flexibility and scalability in connection with using the channels because the systems automatically operate in-real time under the most up-to-date controls. Further, the proper metrics are collected per user and per channel for the marketing campaign. Because the metrics are tied to the marketing campaign, these metrics can be processed to provide a cohesive measure of the success of the marketing campaign. Because the metrics are also tied to the users and the channels, they can be fed back to the channel systems in real-time to further refine the usages of the channels. Existing systems are fragmented and, often incompatible and, hence, do not allow such automated, flexible, scalable, and up-to-date controls, refinements, and measurements.

In the interest of clarity of explanation, various embodiments of the present disclosure are described in connection with a marketing campaign of a marketer. However, the embodiments are not limited as such and similarly apply to any user experience ecosystem of an entity.

As used herein, "a user experience ecosystem" refers to an environment, such as an electronic environment, in which end users interact with channels to access content. The channels may be set-up with a goal to provide a particular user experience associated with the interactions. A marketing campaign is an example of such an ecosystem.

As used herein, "a channel" refers to a medium for providing content. The medium may be an online or offline digital medium. A web page, an email message, a social media post, a television spot, a radio spot are examples of channels that rely on an electronic or digital medium. A user can be exposed to content over a channel. A user interaction with the content represents a touch point with the channel. Multiple exposures to content and/or multiple touch points within one channel or across multiple channels represent a user journey across such channel(s).

As used herein, "a usage of a channel" refers to a definition of how the channel should be used. The definition can include conditions that specify whether the channel should be used and what content should be provided over the channel. The conditions can be specific to the channel itself and can be referred to as intra-channel conditions. For instance, an intra-channel condition specifies that an advertisement should be inserted in an advertisement space of a web page upon a second visit of the user to that same web page. The conditions can relate the usage of a channel with that of another channel and can be referred to as inter-channel conditions. For instance, an inter-channel condition specifies that a particular email message should be sent to an email address if a positive review of a social media post is detected.

As used herein, "a data store" refers to a storage of data in a particular structure. For example, the data store includes a data base, a table, or a matrix. As used herein, "a data entry" is an entry of data in a data store. The type of the data entry depends on the type of the data store. For instance, the data entry can take a key-value pair format in a key-value database. The data entry can take the form of tuple, attribute, and relation in a relational database.

FIG. 1 illustrates an example of a channel management platform 100 for controlling usage of channels of a user experience ecosystem. As illustrated, the channels include a web channel for providing access to web pages. Other channels are also possible, such as a social media channel for providing access to social media posts and an email channel for sending email message. The user experience ecosystem represents a marketing campaign that is set-up by a marketer to provide targeted content on the web pages and the social media posts. The channel management platform 100 may be a computing environment hosted on computing resources, such as on a computing cloud of a data center.

Generally, the channel management platform 100 represents an electronic platform accessible to different systems across the life cycle of a marketing campaign. The operations of these systems are controlled and coordinated by the channel management system 100. For example, the channel management platform 100 is usable to a marketer in the design phase of the marketing campaign and in the operation phase to further refine how the different channels of the marketing campaign are used. The channel management platform 100 is also usable to a content provider to create content for the marketing campaign. Different channel systems control the timing and specific content that is published over the channels in a coordinated manner based on relevant data entries provided from the channel management platform 100.

As illustrated, the channel management platform 100 hosts an application 110, maintains a data store 120, and provides interfaces 130. A marketer device 140, a content system 150, and a web channel system 160 interact with the channel management platform 100 via the interfaces 130 to access the application 110 and the data store 120. This access provides various functionalities that relate to setting-up and using the marketing campaign (or, more generally, various aspects of the user experience system).

Figure 3:
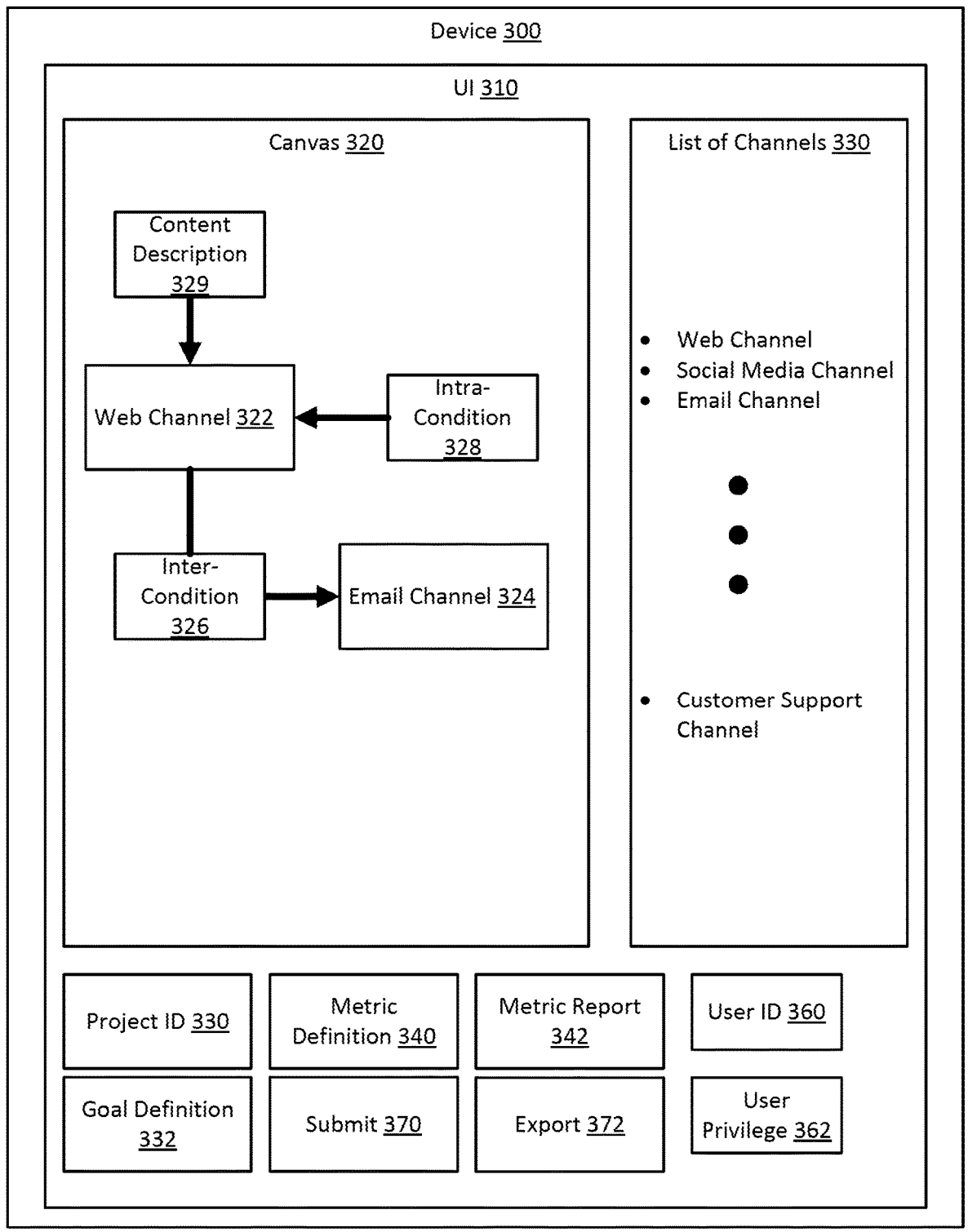
FIG. 3 illustrates an example user interface for setting-up channels of a user experience ecosystem, according to embodiments of the present disclosure.

In some embodiments, the application 110 is hosted on a computing resource, such as a server, of the channel management platform 100. The application 110 contains code, when executed on the computing resource, provides various functionalities. The functionalities include, for example, selecting the channels that form the marketing campaign (e.g., the web channel and the social media channel), and controlling the usage of the channels, tracking metrics about the usage, and visualizing the metrics. FIG. 3 further illustrates embodiments of this user interface. The marketer operates the marketer device 140 to access the application 110 via one of the interfaces 130. The interfaces 130 include one or more of a web interface or an application program interface (API). Through the web interface or API, the application 110 drives a user interface 142 that is presented at the marketer device 140. The marketer interacts with the user interface 142 to perform various operations 144 supported by the functionalities of the applications. These operations 144 include selecting the channels, specifying conditions about how the channels should be used, describing the relevant content that should be provided over each channel, and requesting a report about the success of the marketing campaign. Of course, multiple marketers and/or marketer devices can access the application. The access can be controlled based on credentials, privileges, and/or accounts of the marketers or their devices.

Based on the interactions with the user interface 142, the application 110 generates data entries that capture the operations requested by the marketer. The application 110 stores the data entries in the data store 120 according to a machine readable format. The data store 120 represents storage that receives and stores the data entries and associates the data entries with an identifier (a unique descriptor) of the marketing campaign and, optionally, with an identifier (e.g., the account) of the marketer. FIG. 4 further illustrates embodiments of the data entries and the data store 120.

Once the design of the marketing campaign is complete and the channels are operated (as further described herein below), the application 110 tracks various metrics about the usage of the channels and provides a metrics report 146 to the marketer device 140. The metrics report 146 is presented at the user interface 142 and allows the marketer to monitor the marketing campaign. If changes to the marketing campaign are needed, the marketer can further interface with the application 11 via the user interface 142 and perform additional operations 144.

In some embodiments, the content system 150 includes a set of computing resources that facilitate the creation of content 152 for the marketing campaign. In an example, the content 152 is created in response to and/or is linked to the data entries about the marketing campaign in the data store 120. A content provider, such as a designer or an author of targeted content, operates a content provider device 154 that belongs to the content system 150. The content provider device 154 accesses the application 110 via one of the interfaces 130. This access can be controlled via credentials, privileges, and/or accounts of the content provider and/or content provider 154. The content provider can be alerted about the existence of the data entries and/or the marketing campaign. For example, the application 110 pushes a notification to the content provider device 154 upon the storage of the data entries in the data store 120.

A user interface is provided by the application 110 and presented at the content provider device 154. Through the user interface, the content provider can request a content report 156 about the content that should be created for the marketing campaign. For instance, the user interface provides a list of marketing campaigns with which the content provider is associated and an option to select one or more of such campaigns and request the content report 156. In response to the content provider's interaction with this option, the application 110 accesses the data entries from the data store 120, exports these data entries from the machine readable format to a human readable format that the content provider can review (e.g., a text format, a visual flow, or any other presentation format). The content report 156 includes some or all of the data entries in the human readable format, such as descriptions of the desired content, and is presented at the user interface on the content provider device 154. The content provider then uses this device 154 or any other device to create the content 152 according to the content report 156.

The created content 152 is stored at some storage location(s), such as at a server of the content system, in a computing cloud, or at any storage device that has a network address. The content provider further uses the interface to confirm that the content 152 has been created and, optionally, to provide identifiers 158 of the storage location(s) (e.g., network address(es) such as uniform resource locator(s) (URLs)). In response, the application 110 updates the data store with information about the storage location(s). For example, the application 110 adds the identifiers 158 to the data entries of the marketing campaign.

Although the interaction with the content application 110 to create the content 152 is described in connection with a single content system 150 and a single content provider, similar interactions are possible across multiple content systems, multiple content providers, and/or multiple content provider devices. Generally, a content provider can interact with the application 110 if a marketing campaign is associated with the content provider and if the content provider has the proper account, credentials, and/or privileges.

In some embodiments, the application 110 sends a notification about a marketing campaign and the associated content to a web channel system 160. The web channel system 160 includes a set of computing resources that facilitate providing some or all of the content 152 over a web page 165 to an end user device 180. The web page 165 is hosted on a web server 163 of the web channel system 160, where the web server 163 is accessible to the end user device 180 over a data network. The web page 165 represents a channel (in this case, a web channel) that is available from the web server 163 and that presents content to an end user (e.g., a customer of the marketer). Generally, an electronic channel (e.g., a web channel, a social media channel, an email channel, etc.) publishes electronic content from a source (e.g., a web server, a social media server, a mail server) to a computing device of an end user for presentation at the computing device (e.g., at some user interface). This usage of an electronic channel can be referred to as content publication.

The content publication over the web channel (e.g., the content inserted in the web page 165) depends on channel controls 162. The channel controls 162 represent a set of parameters that specify conditions that should be met for publishing particular content over the web channel. These parameters can be derived from the data entries of the marketing campaign from the data store 120 and stored locally at the computing resources of the web channel system 160.

For example, these computing resources include a channel provider device 164. The notification about the marketing campaign can be received by this device 164. In turn, the channel provider device 164 automatically accesses the data store 120 via one of the interfaces 130 and/or submits a query to the application 110. The access and/or query identify the marketing campaign. The relevant data entries and identifiers of the storage locations 132 of the content are returned from the data store to the channel provider device 164. The channel provider devices 164 generates the parameters based on the dependencies defined in the data entries and storage locations 132 and stores the parameters as the channel controls 162.

Other variations to triggering the automatic creation of the channel controls 162 are possible. For instance, the data entries and storage location identifiers 162 can be pushed to the channel provider device 164 (e.g., pushed in the notification). Further, the creation of the channel controls need not be automated. For instance, the channel provider device 164 is operated by a channel provider of the web channel system 160 (e.g., a user that has authority to set the channel controls 162). The notification can be sent to an account of the channel provider. Similar to the content provider of the content system 150 above, the channel provider here operates the channel provider device 164 to access the application 110 via one of the interface 130. A user interface is presented to the channel provider at the channel provider device 164. The channel provider can then request a report about the marketing campaign. The application 110 would export the report by including the data entries and the identifier(s) of the storage location(s) of the content in a human readable format. The channel provider can review the report and further operates the channel provider device 164 to create the channel controls 162 accordingly.

In some embodiments, the web channel system 160 further includes a collection server 166. The collection server 166 tracks user interactions 167 over the web channel (e.g., the user interactions with the web page 165 that is presented at the end user device 180). Some of the interactions can be with the content of the marketing campaign published over the web page 165 or with other portions of the web page 165. For instance, the collection server 166 stores tracked data that identify the end user (e.g., such as an internet protocol (IP) address of the end user device) and indicate touch points of the end user. A touch point includes an interaction of the user with the channel 170 (e.g., did the end user visit the web page where an advertisement was placed), and/or an interaction of the end user with the published content of the marketing campaign over the channel 170 (e.g., did the user click on the advertisement). In addition, the collection server 166 associates the tracked data with the marketing campaign. For instance, the collection server 166 stores the identifier of the marketing campaign along with the tracked data.

The tracked data and its association with the marketing campaign 134 can be reported back, via one of the interfaces 130, to the application 110 for processing or storage at the data store 120 or directly to the data store 120 for storage thereat and subsequent processing by the application 110. The application 110 tracks the data collected across the different channels of the marketing campaign (e.g., over also the social media channel and the email channel if used) based on the identifier of the marketing campaign being included with the tracked data. The tracking allows the application 110 to measure the success of the marketing campaign across the channels and to feedback this success to the channel systems such that the channel controls can be refined or adjusted. This type of processing and feedback is further described in connection with FIG. 5.

Hence, the channel management platform 100 represent a single electronic platform that enables coordination across multiple systems. A marketer accesses the channel management platform 100 to define various aspects of a marketing campaign including a selection of the desired channels, a definition of how each of the channels should be used and the usage dependencies between channels, and a description of the desired content. The channel management platform 100 also reports metrics about the success of the marketing campaign to the marketer and enables refinement to the various aspects of the marketing campaign. A content provider also accesses the description of the desired content and creates and provides such content through the channel management platform 100. Controls of the underlying channel systems are set based on the relevant data entries from the channel management platform 100. Such controls allow the coordination of how the different channels are to be used and the content and of the content that is published over these channels.

Although the collection server 166 is described as a component of the channel system, the collection server 166 can be instead a component of the channel management platform 100, the channel 170, or the content system 150. Similarly, although each of the content system 150 and the web channel system 160 is described as a separate component that interfaces with the channel management platform 100, these systems 150 and 160 may be a single system and/or may be system(s) of the channel management platform 100.

Figure 2:
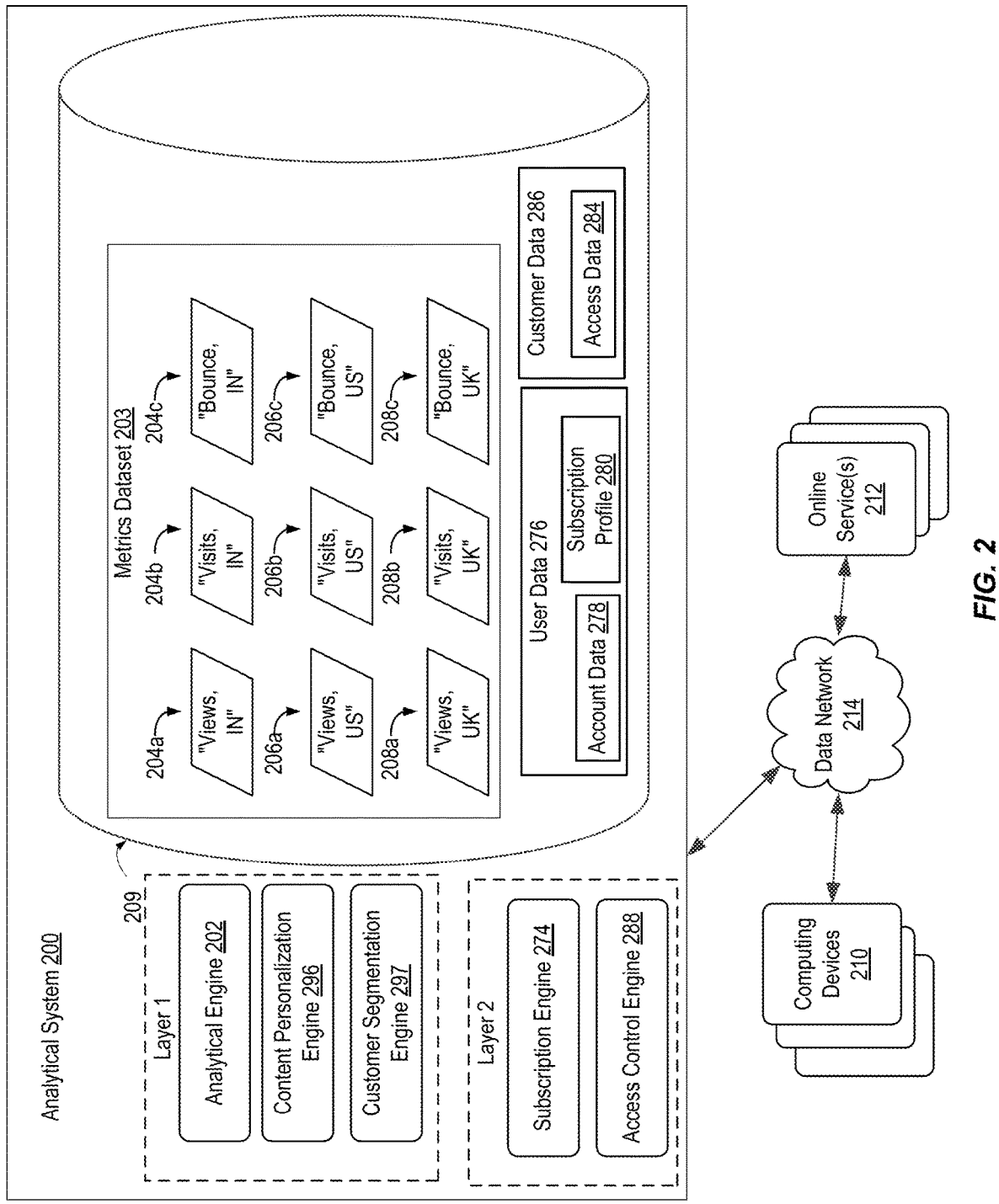
FIG. 2 illustrates an example of a computing environment in which an analytical system is used for providing a user experience ecosystem, according to embodiments of the present disclosure.

FIG. 2 illustrates an example of a computing environment in which an analytical system 200 is used for providing a user experience ecosystem, such as one that uses multiple channels within a marketing campaign. The computing environment includes an analytical system 200 (which can be included in or otherwise used by a channel management platform), one or more computing devices 210, and one or more online services 212. The analytical system 200, computing devices 210, and online services 212 are communicatively coupled via one or more data networks 214 (e.g., the Internet, one or more local area networks, one or more wide area networks, or some combination thereof).

Each of the computing devices 210 is connected (or otherwise communicatively coupled) to the analytical system 200 via a network 214. A user of one of the computing devices 210 uses various products, applications, or services supported by the analytical system 200 via the network 214. Examples of the users include, but are not limited to, marketing professionals who use digital tools to generate, edit, track, or manage online content, or to manage online marketing processes, end users, administrators, users who use document tools to create, edit, track, or manage documents, advertisers, publishers, developers, content owners, content managers, content creators, content viewers, content consumers, designers, editors, any combination of these users, or any other user who uses digital tools to create, edit, track, or manages digital experiences.

Digital tools, as described herein, include a tool that is used for performing a function or a workflow electronically. Examples of the digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. Digital tools include the marketing apparatus 200.

Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

The analytical system 200 includes one or more devices that provide and execute one or more engines for providing one or more digital experiences to the user. In an example, the analytical system 200 represents a marketing apparatus that facilitates marketing-related functionalities including, the selection, use, and control of channels of a marketing campaign. The analytical system 200 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like.

The analytical system 200 also includes a data storage unit 209. The data storage unit 209 can be implemented as one or more databases or one or more data servers. The data storage unit 209 includes data that is used by the engines of the analytical system 200.

In some embodiments, the analytical system 200 can be divided into two layers of engines. For example, Layer 2 includes core engines that provide workflows to the user and Layer 2 includes shared engines that are shared among the core engines. Any core engine can call any of the shared engines for execution of corresponding task. In additional or alternative embodiments, the analytical system 201 does not have layers, and each core engine can have an instance of the shared engines. In various embodiments, each core engine can access the data storage unit 209 directly or through the shared engines.

In some embodiments, the user of a computing device visits a webpage of an application store to explore applications supported by the analytical system 200. The analytical system 200 provides the applications as a software as a service ("SaaS"), or as a standalone application that can be installed on one or more of the computing devices 210, or as a combination. The user creates an account with the analytical system 200 by providing user details and also by creating login details. In additional or alternative embodiments, the analytical system 200 can automatically create login details for the user in response to receipt of the user details. The user can also contact the entity offering the services of the analytical system 200 and can get the account created through the entity. The user details are received by a subscription engine 274 and stored as user data 276 in the data storage unit 209. In some embodiments, the user data 276 further includes account data 278, under which the user details are stored.

A user can opt for a subscription to one or more engines of the analytical system 200. Based on subscription details of the user, a user subscription profile 280 is generated by the subscription engine 274 and stored. The user subscription profile 280 is stored in the data storage unit 209 and indicates entitlement of the user to various products or services. The user subscription profile 280 also indicates types of subscription, e.g., premium subscription or regular subscription.

Each engine of the analytical system 200 also stores customer data 286 for the user in the data storage unit 209. The user or the entity of the user can have one or more customers (e.g., end users), including potential customers, and hence, the one or more engines of the analytical system 200 store the customer data 286. The customer data 286 can be shared across these engines or can be specific to each engine. In some embodiments, the access data 284 is a part of the customer data 286. The access to the customer data 286 is controlled by an access control engine 288 which can be shared across the engines of the analytical system 200 or each engine can have one instance of the access control engine 288. The access control engine 288 determines if the user has access to a particular customer data 286 based on the subscription of the user and access rights of the user.

A user of the analytical system 200 can enable tracking of the content while creating content or at any other point. Various methods of tracking can be used. For example, tracking code can be embedded into the content for tracking and sending tracked data to the analytical engine 202. The analytical engine 202 tracks the data and stores tracked data as metrics data 203 or other analytics data. The analytical engine 202 tracks the data and performs meaningful processing of the metrics data 203 or other analytics data to provide various reports to the user. In addition, in some embodiments, the analytical engine 202 also acts as a shared engine and is accessible by other engines to obtain meaningful analysis on the basis of which other engines can offer various functionalities to the user. In additional or alternative embodiments, each engine can have an instance of the analytical engine 202 which is customized according to the needs of that engine. In various embodiments, the analytical engine 202 is used for tracking one or more types of content, such as mobile applications, videos, images, websites, documents, advertisements, etc. In some embodiments, the analytical engine 202 also supports predictive intelligence to provide predictions based on the metrics data 203 or other analytics data. In some embodiments, the analytical engine 202 also stitches information tracked from various sources where the content is consumed and provides a holistic view (e.g., a 360 degrees' view) of the metrics data 203 or other analytics data.

In some embodiments, the analytical system 200 also includes a content personalization engine 296. The content personalization engine 296 enables the user to provide different digital experiences to the customers (e.g., to end users that access webpages) when different customers visit the same webpage or same application of the user. The content personalization engine 296 provides various workflows to the user to create different versions of the webpage or the application or the content and to perform AB testing. Based on the testing, the user may choose to provide different personalization for different sets of customers. The content personalization engine 296 also uses the customer data 286. The customer data 286 includes customer profiles. The customers, as described herein, also includes mere visitors which are not customers yet. A profile includes one or more attributes of a customer. An attribute, as described herein, is a concept using which customer can be segmented. Examples of the attribute include, but are not limited to, geographical location, age, gender, purchase capacity, language, habits, browsing trends, or any other attribute using which the customers can be segmented.

The customer data 286, at least some of which may be included in the metrics data 203 or stored separately from the metrics data 203, is generated by a customer segmentation engine 297 by collecting data from different sources including electronic sources, such as the analytical engine 202, online forms, customers submitting data online, and other online sources, and non-electronic sources including paper forms and other offline sources. The customer data 286 can be shared between users and some of the customer data 286 can be specific to each user and not accessible by other users. The customer segments are used by the content personalization engine 296 to personalize content and show relevant content to the customers. In addition, the content personalization engine provides automated workflows to enable the personalization including providing recommendations for the content that should be shown to a particular customer segment.

In various embodiments, the customer data 286 also includes data regarding devices used by the customers. The device data is used for stitching customer data. For example, a customer 2 may use device 2 to visit website A. The customer 2 may user device 2 to visit website B. The website A and the website B may belong to the same user. So, instead of considering customer 2 as two different customers the data including at least one common identifier such as email id helps the user to identify that the two different visits were made by the same customer 2. Also, by analyzing the customer data 286 and the metrics data 203 or other analytics data, richer customer profiles or segments can be generated. Also, devices that correspond to the same customer can be identified resulting in providing a more targeted digital experience to the customer and making benefits for the user.

In some embodiments, the metrics dataset 203 depicted in FIG. 2 includes segments 204a-c, 206a-c, 208a-c. The segments 204a-c include metrics data describing a first metric (e.g., numbers of page views) for an online service. The segments 206a-c include metrics data describing a second metric (e.g., number of website visits) for an online service. The segments 208a-c include metrics data describing a third metric (e.g., bounce rates) for an online service. In some embodiments, metrics datasets are divided into certain data dimensions, such as (but not limited to) dimensions identifying geographic regions associated with online activities, dimensions identifying demographic traits associated with online activities, dimensions identifying different device types used to conduct online activities, or other suitable data dimensions. For instance, in the example depicted in FIG. 2, the "page views" metric is divided based on geographic dimensions, where the segment 204a includes page views associated with interactions originated by computing devices in India, the segment 204b includes page views associated with interactions originated by computing devices in the United States, and the segment 204c includes page views associated with interactions originated by computing devices in the United Kingdom. Likewise, the "website visits" metrics data includes a segment 206a associated with India, a segment 206b associated with the United States, and segment 206c associated with the United Kingdom. The metrics data for bounce rates and exit events is similarly organized according to geographic dimensions (i.e., attributes common to the segments).

In some embodiments, the analytical engine 202 processes data received from one or more online services 212, data generated from interactions with one or more online services 212 by computing devices 210, or any other data associated with one or more online services 212. The various metrics datasets in the metrics dataset 203 are generated from interactions by the computing devices 210 with the online services 212. The online services 212 provide applications, data, and other functions that are accessed by one or more computing devices 210 via the Internet or one or more other suitable data networks 214. Examples of the online services 212 include (but are not limited to) social media websites, websites for purchasing products or services, etc.

The computing devices 210 execute respective user applications that are used to access the online services 212. In some embodiments, one or more of the computing devices executes at least one application supported by the analytical system 200. Examples of the user applications include, but are not limited to, web browsers for accessing websites provided by the online services and applications specific to the online services. Examples of the computing devices 210 include, but are not limited to, a personal computer ("PC"), tablet computer, a desktop computer, a processing unit, any combination of these devices, or any other suitable device having one or more processors.

FIG. 3 illustrates an example user interface 310 for setting-up channels of a user experience ecosystems. The user interface 310 provides various functionalities that relate to setting-up and using a marketing campaign (or, more generally, various aspects of a user experience system). This user interface 310 is available during a design phase of the marketing campaign and allows one or more users to articulate various features of the marketing campaign. The user interface 310 can also be available at any point during an operation phase to update these features.

As illustrated, the user interface 310 is presented at a device 300. An application hosted on an electronic platform, such as the application 110 hosted on the channel management platform 100 of FIG. 1, drives the user interface 310. For example, an instance of the application can be running on the device 300 and/or the device 300 may access the application from the electronic platform over web interface or an API. As described in connection with FIG. 2, the device 300 can be a computing device of a marketer. Additionally or alternatively, the device 300 can be a computing device of a content provider or of a channel provider if such users have the proper accounts, credentials, or privileges. Because the application is hosted on the electronic platform, the application can be to some extent centrally located such that the articulation of the marketing campaign can be shared and accessible to various users (e.g., marketer, content provider, channel provider), each responsible and authorized for particular features of the marketing campaign.

In some embodiments, the user interface 310 includes a canvas 320 for defining the marketing campaign. Defining the marketing campaign includes specifying or identifying the channels that should form the marketing campaign and how these channels should be used. The canvas 320 includes a space (which initially may be blank) where interactions of the marketer (and, similarly, authorized content and channels providers) can be received to complete the definition.

In an example, the user interface 310 presents available channels 330 from which the marketer can select particular channels. For instance, the available channels 330 can be presented in a list. The user interface 310 allows a selection operation, such as a drag and drop operation or a check box selection, to add one or more of the available channels 330 to the canvas 320. When a channel is added to the canvas 320, the underlying application associates the channel with the marketing campaign to indicate that the channel will be used in the marketing campaign. For instance, the application generates a data entry that correlates an identifier of the channel with an identifier of the marketing campaign. Similarly, the user interface allows a removal operation, where a channel added to the canvas 320 is selected and removed from the marketing campaign by way of the removal operation (e.g., a drag and drop from the inside to the outside of the canvas 320).

To define how the added channels should be used, the canvas 320 allows additional interactions of the marketer via the user interface 210 to define conditions of the usage and to describe the relevant content that should be provided over each of the added channels. There may be multiple types of conditions. One type defines how one added channel should be used relative to another added channel(s). These conditions can be referred to as inter-channel conditions. Another type defines how one added channel should be used relative to usage parameters of the channel itself. These conditions can be referred to as intra-channel conditions. The marketer can define these conditions by selecting the relevant channel(s) and inputting via the user interface 210 information about the specific conditions. Further, the marketer can describe in a text format, graphic format, or any other presentation format, the content that should be used in each channel. This content can be pre-existing, in which case, the marketer's description includes an identifier of the content or its storage location. If not available yet, the description allows the creation of such content at a downstream content system. In turn, the underlying application generates data entries that capture these conditions in a set of rules and that capture the content descriptions. The set of rules includes conditional expressions (e.g., "if-then" statements) that define the dependencies between the channels and within each channel.

In the illustrative example of FIG. 3, two channels are added to the canvas 320: a web channel 322 and an email channel 324. The web channel 320 represents a channel for publishing content in a space of a web page. The marketer identifies, in the canvas 320, the URL of the web page. The email channel 340 represent a channel for publishing content in email messages that can be sent to email addresses. The marketer identifies, in the canvas, groups of end users that should receive the email messages. In addition, the marketer defines, in the canvas 322, an inter-condition 326 between the web channel 322 and the email channel 324. The inter-condition 326 specifies that, for instance, sending an email message about a product discount to an end user is conditioned to a visit of the end user to the web page and/or to a click of the end user with the advertisement in the space of the web page. The marketer also defines, in the canvas 322, an intra-condition 328 for using the web channel 328. The intra-condition 328 specifies that, for instance, the static advertisement should be shown in the space upon an initial visit of the end user to the web page and conditions the display of the dynamic visit to a return of the end user to the web page. In this example, the application generates, for instance, data entries expressed as "if user visits=1, insert static advertisement; if user visits>1, insert dynamic advertisement; if user click on static or dynamic advertisement=>1, send email about product discount" to capture the dependencies between the usages within the web channel 322 and across both channels 322 and 324.

Other conditions are of course possible. For instance, a location-based condition is possible. The location-based condition specifies that certain content should be provided over one or more of the channels based on a location of the end-user. Further, some of the conditions need not relate to end users. For instance, some conditions can be time-based or channel-based. A time-based condition specifies that certain content should be provided over one or more of the channels based on a time factor (e.g., provide informational content about a product for the first week of January, and content about a discount for the second week of January). A channel-based condition specifies that certain content should be provided over one or more of the channels (e.g., provide a static advertisement in a space of a web page and a dynamic advertisement in a social media post).

In addition to the conditions, the marketer describes, via the canvas 320, the content that should be provided over the web channel 322 and the email channel 324. In an example and referring to the web channel 322, the marketer inputs at the canvas 320 a content description 329. This description 329 can vary depending on whether the desired content exists or not. If not available yet, the content description 329 includes a description about the type of the targeted content (e.g., a static advertisement, a dynamic advertisement, etc.) and descriptive attributes of this content (the static advertisement should show two children playing with a puppy at beach, with a tag line that says that it is never too early to save for retirement). In this case, the canvas 320 allows text inputs, graphics (e.g., image) uploads, and/or other operations to describe the desired content. If the content is available, the content description 329 includes an identifier of this content, such as a URL of its storage location, its title, or other information that uniquely identifies the existing content. In this case, the canvas 320 can display a content selection list from which the desired content can be selected. Similar content description can be used for the email channel 324 (to describe the topics and content of the email messages). Once the desired content is described, the application updates the data entries with the descriptions of this content.

In some embodiments, the user interface 310 includes additional user interface (UI) elements that support additional operations for refining aspects of the marketing campaign. For example, the user interface 310 includes project identifier 330 as an input field. The marketer inputs the identifier of the marketing campaign in this field. The user interface 310 also includes a goal definition 332 as another input field. The marketer can input a description of the goal of the marketing campaign (e.g., increase click rate by 5%) in this field. This goal would be presented at the user interface 310 in the field and included in any report out to users (e.g., the marketer, content provider, or channel provider).

Another example of a UI element includes a metric definition 340 input field. The metric definition allows the marketer to request or define a specific metric(s) that should be tracked for the marketing campaign. For instance, the marketer can input in this field that the number of times an advertisement is presented to users and the number of times the advertisement is selected by some of the users should be tracked. In connection with the metric definition 340, the user interface 310 can present a metric report 342 option. This option can be a selectable UI element that would trigger the application to process the tracked data (according to the specified metrics) and generate a report about the observed metrics as a measure of the success of the marketing campaign. The report can be presented in the user interface 310 and/or send as an electronic file to an account of the marketer.

Yet another example of a UI element includes a user identifier 360 input field. In this field, the marketer can identify each user (whether a single operator with proper authority, or a relevant organization) that should be responsible for creating the content of a channel, for setting the control of the channel, or for defining inter or intra-channel conditions. In an example, the application can track a list of authorized users and the assigned responsibilities to each per marketing channel. The application would surface the identifiers of the user in the user identifier 360 input field based on this tracking. For instance, the application can use a threshold to determine if a user has enough bandwidth to take on the marketing campaign. If the number of marketing campaigns that the user is assigned to is below the threshold, the identifier of that user is surface. Otherwise, the user's identifier is not presented at the user interface 310. Of course, the threshold can be preset to a certain number (e.g., five marketing campaigns) and can vary based on the responsibilities assigned to the user and/or the privileges of the user.

In conjunction with the user identifier 360 input field, the user interface 362 also presents a user privilege 362 input field. The marketer can use this field to define the privilege (e.g., how much authority) a user has with respect to the definition of the marketing campaign and the usage of its channels. In this way, the canvas 320 (or, more generally, the definition) can be selectively shared with, and aspects of the marketing campaign can be contributed among, a number of users. For instance, the marketer may specify that another marketer can add or remove channels to or from the marketing campaign, while a content provider can only edit the type of content that is tied to a channel.

Yet another example of a UI element includes a submit 370 option. This option can be a selectable UI element that would trigger the application to generate and store the various data entries in the data store, and generate and send various notifications to the users identified as responsible for aspects of the marketing campaign. In conjunction with the submit 370 option, the user interface 362 also presents an export 372 option. This option can be a selectable UI element that would trigger the application to generate a report that includes the data entries in a human readable format.

FIG. 4 illustrates examples of data entries in a data store, where the data entries specify usages of channels of a marketing campaign (or, more generally, of a user experience ecosystem). The fields of the data entries can be predefined. In comparison, the values of some or all of the data entries are defined during a design phase of the marketing campaign. As described in connection with FIG. 3, an application generates the values based on interactions of authorized users with a user interface and/or access of such users to an underlying application through a web interface or an API. The data store may be centrally located (e.g., accessible to various systems). Once stored in the data store, the values are used to control the usages of the channels during the operation phase. For example, various channel systems access and use some or all of the values from the data store to define channel controls.

In some embodiments, the fields of the data entries include a campaign identifier 410, a channel identifier 420, a usage descriptor 430, a dependency descriptor 440, a content descriptor 450, and a content identifier 460. Each of these fields is described herein next. The structure of the data store (e.g., organization and types of fields) depends on the underlying type of the data store (e.g., key-value database, relational database, table, matrix, etc.).

The campaign identifier 410 stores an identifier that uniquely identifies the marketing campaign within an electronic platform. The identifier can consist of alphanumerical values specified by a marketer or generated by an underlying application.

The channel identifier 420 stores, for each channel of the marketing campaign, an identifier that uniquely identifies the channel within the electronic platform. The identifier can consist of predefined alphanumerical values and can be added to the data store (e.g., under the channel identifier 420) based on an addition of the channel to the marketing campaign (e.g., via a selection operation at a user interface of the underlying application).

The usage descriptor 430 stores a description of an operation to be performed with respect to providing content over a channel of the marketing campaign. The description can follow a machine readable format (e.g., defined as a machine readable command or instructions that define the operation) and can be generated and added to the data store by the underlying application (e.g., under the stage descriptor 430) based on user input about a usage of the channel (e.g., via a canvas at the user interface of the underlying application).

The dependency descriptor 440 stores a description of dependencies between the operations defined under the usage descriptor 430. The dependencies can be for operations within a same channel or across two or more channels. The description can follow a machine readable format of conditional expressions. For instance, each dependency can be expressed as if-then statements, where the if statement is stored under one sub-field of the dependency descriptor 440 and where the then statement is stored under another sub-field of the dependency descriptor 440. The if statement captures a condition that should be met, whereas the then statement captures the operation and its association to the relevant content. The conditional expressions can be generated and added to the data store by the underlying application (e.g., under the dependency descriptor 440) based on user input about conditions of the channel (e.g., via a canvas at the user interface).

The content descriptor 450 stores, for each operation in a channel, a description of the content that should be provided over the channel. If the content is available and need not be created, the description can identify that this content is existing. Otherwise, the description includes various descriptive attributes about the type of the content and the features of the content (e.g., the general topic, the message that should be provided, any key phrase(s) to be used, any multimedia elements, etc.).

The content identifier 460 stores, for each operation, an identifier that uniquely identifies, within the electronic platform, the specific content application to that operation. The identifier can consist of predefined alphanumerical values that capture a storage location of the content (e.g., a URL of the content). If the content already existing, the identifier is added to the data store (e.g., under the content identifier 460) based on user input of the marketer with the user interface. Otherwise, the identifier can be added to the data store based on user input of the content provider with an interface of the underlying application (e.g., via a user interface, web interface, or API).

Hence, during the design phase, the values of at least the campaign identifier 410, channel identifier 420, usage descriptor 430, dependency descriptor 440, and content descriptor 450 are initially defined. If the desired content is not already available, a content system accesses the data store and retrieves these values. A content provider then generates the relevant content based on, for example, the content descriptor 450 and, optionally, the channel identifier 420, usage descriptor 430, and/or dependency descriptor 440. The values of the content identifier 460 would be added to the data store. In the operation phase, because the data store is accessible to various channel systems, each channel system can retrieve the values specific to the channel(s) subject to its control based on the identifier(s) of the channel(s). The usages of such channels are accordingly automatically controlled. Because the values capture inter and intra-channel conditions, some of which depend on the end users and others that may be independent thereof (e.g., time-based conditions), the usages of the channels and the providing of the content to the end users is centrally coordinated across the channels of the different channel systems.

Figure 5:
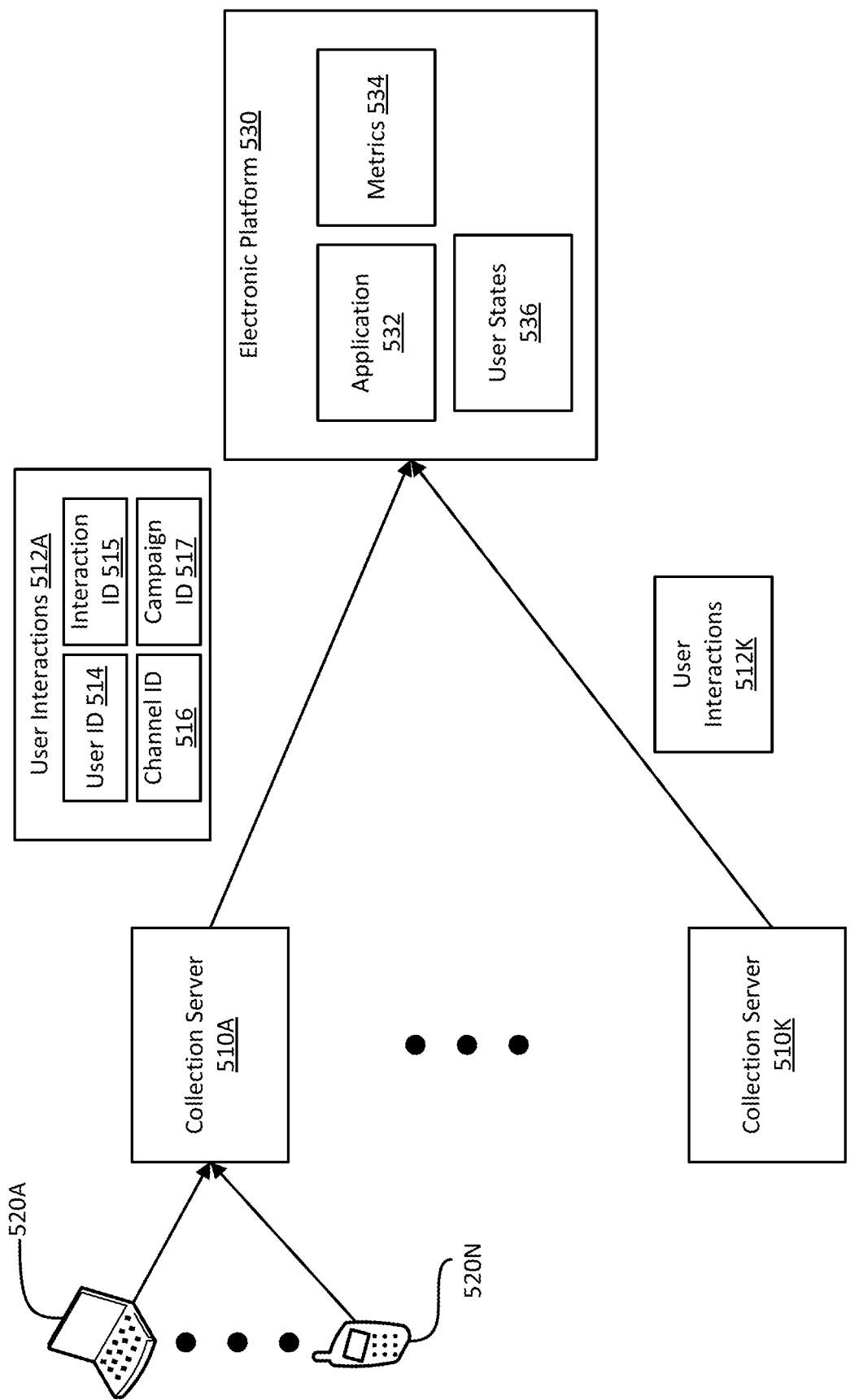
FIG. 5 illustrates an example of a metric collection related to usage of channels of a user experience ecosystem, according to embodiments of the present disclosure.

FIG. 5 illustrates an example of a metric collection related to usage of channels of a marketing campaign (or, more generally, a user experience ecosystem). Various types of metrics can be collected in an operation phase. Some or all of the metrics reflect a measure of success and can be used to further control the usage. More specifically, the various metrics are associated with the channels within which they were measured and the marketing campaign. In this way, the metrics can be processed per channel and across the marketing campaign and can be surfaced in a presentation format to a marketer via a user interface. Accordingly, the marketer ascertains the success of each channel and of the marketing campaign. Changes to the marketing campaign can be further made through the user interface. For example, an underperforming channel is removed from the marketing campaign via a removal operation at a canvas of the user interface. A new channel is added via a drag and drop operation at the canvas. The usage conditions and/or the descriptions of the content are also updated via interactions at the canvas. In addition to visualizing the success per channel and across the marketing campaign, the metrics allows controls of the usage of the channels. Some of the usage conditions depend on interactions of end users with the channels and/or content provided over the channels. The metrics can track such interactions, thereby allowing a determination as to whether or how the conditions are met. The usage of the control channels is updated or directed according to this type of determination. These and other features of the metrics collection are further described herein next.

As illustrated, a number of collection servers 510A-510K collect metrics. The metrics generally relate to interactions of end users with channels. Some of the interactions occur based on end user devices accessing the channels and/or content provided over the channels. For instance, the collection server 510 monitor and tracks the interactions of end users via end user devices 520A-520N with a particular set of channels and/or content.

In some embodiments, the collection server 510A generates user interaction 512A based on the monitoring and tracking. The user interactions 512 stores various types of collected data. For example, the user interactions include identifiers 514 of the end users (e.g., each identifier uniquely identifies an end user to an electronic platform 530). The user interactions 512 also include identifiers 515 of the user interactions 512 (e.g., each identifier uniquely identifies a user interaction to the electronic platform 530, such as whether the user interaction is a click of an advertisement, a positive review of a social media post, a re-post of a social media post, etc.). Further, the user interactions 512 include identifiers 516 of the channels (e.g., each identifier uniquely identifies, to the electronic platform 530, a channel or content provided over the channel, where the channel is identified in association with a user interaction with the channel or with the content). In addition, the user interactions 512 include an identifier 517 of the marketing campaign (e.g., the identifier uniquely identifies the marketing channel to the electronic platform 530, where the marketing campaign is identified in association with a user interaction with any channel or with content provided over any channel of the marketing campaign).

Of course, other types of data can be collected (e.g., time stamps, locations, etc.). Generally, the collected data depends on the desired metrics. Some of the metrics are defined by an authorized user (e.g., a marketer, a content provider, or a channel provider) via an interface (e.g., the marketer specifies that a conversion rate should be measured; accordingly, end user views and clicks on an advertisement are tracked). Other metrics are derived from the conditions of usage of the channels (e.g., if the conditions dictate that a particular advertisement should be shown only if an end user visits a web page, the interaction of the end user with the web page is tracked).

In some embodiments, the user interactions 512 are sent to the electronic platform 530 for further processing. Additionally or alternatively, the collection server 510A processes the user interactions and sends an output of the processing to the electronic platform 530. In either case, the processing includes generating the metrics based on the user interactions 512. For instance, statistical analysis is applied to the user interactions 512 to derive counts, averages, deviations, trends, regressions, etc. as various types of metrics per end user, per channel, and across the campaign (metrics across the campaign are typically generated by the electronic platform).

Other collection servers, such as the collection server 510K, may do the same for the same group or for a different group of end user devices, and for the same or a different set of channels and/or content. Accordingly, the collection server 510K generates and sends similar user interactions 512K to the electronic platform.

In some embodiments, the electronic platform 530 hosts an application 532, similar to the application 110 of FIG. 1. The application 532 processes the received user interactions 512A-512K and/or the received metrics (generated by the collection servers 510A-512K based on the user interaction 512A-512K). The processing includes generating metrics 534 based on the user interaction 512 (or, based on the received metrics) and storing the metrics 534 (and, optionally, the user interactions 512-512K) in a data store of the electronic platform 530. In an example, each metric (and user interaction) is associated with an end user (e.g., based on the identifiers 514 of the end users), with a channel (e.g., based on the identifiers 516 of the channels), and with the marketing campaign (e.g., based on the identifier 517 of the marketing campaign). These associations (e.g., the identifiers 514, 516, and 517) are stored in the data store along the metrics. In this way, the application 532 can output various types of metrics per end user, per channel, and across the marketing campaign (counts, averages, deviations, trends, regressions, etc.).

In addition, the application 532 maintains user states 536. The user states 536 can be stored in the data store and can be associated in the data store with the end users, channels, and marketing campaign (e.g., via the identifiers 514, 516, and 517). Each user state identifies an end user (e.g., via one of the end user identifiers 514), tracks metrics about the end user and/or metrics about user interactions of the end user, and tracks the details of the user interactions (e.g., type of a user interaction, associated channel, associated content, time stamp, location, etc.).

In some embodiments, the user states 536 are directly accessible to channel systems (e.g., via one or more interfaces of the electronic platforms 530) and/or are provided from the application 532 (pushed to on-demand sent to) to such systems. Accordingly, the channel systems can have up-to-date data about the user interactions and relevant metrics thereof per end user, per channel, and across the marketing campaign. Because some of the conditions for the channel controls depend on such data, the channel systems are capable of automatically synchronizing the usage of each channel and the usage of the various channels across the marketing campaign based on the user states 536. Hence, if one particular advertisement should be shown in a web page upon a second visit of an end user to the web page, a channel system responsible for the web channel can automatically insert that advertisement in the space of the web page if the user states 536 identify that the end user has at least one previous visit to the web page. Similarly, if the advertisement should be shown if the user had a positive review of a relevant media post, the channel system can also automatically insert the advertisement in the space if the user states 536 identify that the end user has provided the positive review.

Figure 6:
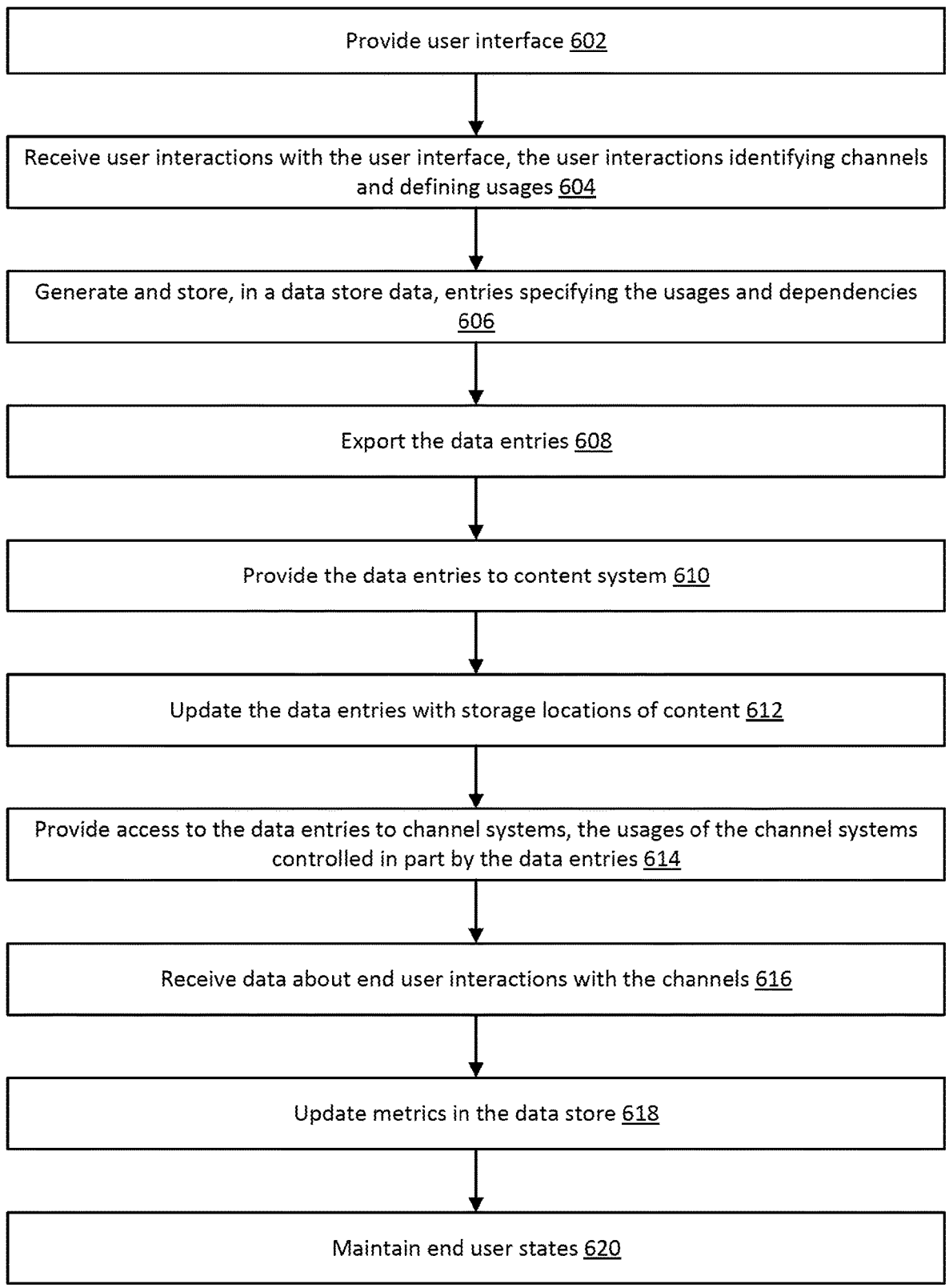
FIG. 6 illustrates an example flow for controlling usage of channels of a user experience ecosystem, according to embodiments of the present disclosure.

FIG. 6 illustrates an example flow for controlling usage of channels of a marketing campaign (or, more generally, a user experience ecosystem). A computer system may be configured to perform the illustrative flows. For example, the computer system can host the channel management platform 100 of FIG. 1 and can host an application, such as the application 110 of FIG. 1. Instructions for performing the operations of the illustrative flow can be stored as computer-readable instructions on a non-transitory computer-readable medium of the computer system. As stored, the instructions represent programmable modules that include code or data executable by a processor of the computer system. The execution of such instructions configures the computer system to perform the specific operations shown in the figures and described herein. Each programmable module in combination with the processor represent a means for performing a respective operation(s). While the operations are illustrated in a particular order, it should be understood that no particular order is necessary and that one or more operations may be omitted, skipped, and/or reordered.

The flow of FIG. 6 starts at operation 602, where the computer system provides a user interface. In an example, the user interface is provided to a computing device of an authorized user, such as a marketer, content provider, or channel provider, as illustrated in connection with FIG. 3. The authorized user has an account for using the application. The account defines privileges and responsibilities of the authorized user. The user interface is presented at the computing device and provides the authorized user with access to the application.

At operation 604, the computer system receives user interactions with the user interface. The user interactions represent interactions of the authorized user with the application via the user interface. The user interactions identify channels of the marketing campaign and define usages of the channels. For example, the user interactions add the channels to a canvas presented at the user interface. The user interactions also define inter and intra-conditions for using the added channels and describe the desired content that should be provided over each channel. Via various UI elements of the user interface also, the authorized user identifies the marketing campaign, defines a goal, specifies the metrics that should be collected, identifies various other authorized users and their responsibilities, and assigns privileges to these users. The computer system can notify such users of the marketing campaign and provide them access to the application via a similar user interface.

At operation 606, the computer system generates and stores data entries specifying the usages of the channels and dependencies between the usages and describing the desired content. For example, upon a user interaction with the user interface indicating a selection of a "submit" UI element, the application generates the data entries in a machine readable format, as illustrated in connection with FIG. 4. The application also stores the data entries in the machine readable format in a data store, as illustrated in connection with FIG. 4.

At operation 608, the computer system exports the data entries. For example, upon a user interaction with the user interface indicating a selection of an "export" UI element, the application accesses the data store and generates a report that includes the data entries in a human readable format. The report is presented at the user interface or sent to an account of the requesting user (e.g., the authorized user).

At operation 610, the computer system provides access to the data entries to a content system (and, similarly, to multiple content systems if the desired content is not already available). In one example, the values of the data entries are sent to a content provider device of the content system. In another example, pointers to the data entries as stored in the data store are sent to the content provider device. The pointers identify the locations of the data entries in the data store and allows the content provider devices to access the values from these locations in the data store (e.g., by submitting queries to the data store or by accessing the data store and performing a lookup). The used pointers depend on the structure of the data store. For example, the pointers can be keys of a key-value pair database. Accordingly, the content provider device accesses the data entries from the data store. In response, the content provider device generates or associates content with the data entries. The content can be stored at some storage location. The storage location can be the data store or some other storage at a network location.

At operation 612, the computer system updates the data entries with the storage locations of the content. For example, the application associates each data entry with an identifier of a storage location of the relevant content. This association can take the form of adding the storage location identifier to the proper data entry field, as illustrated in connection with FIG. 4.

At operation 614, the computer system provides access to the data entries to a channel system (and, similarly, to multiple channel systems). In one example, the values of the data entries are sent to a channel provider device of the channel system. In another example, pointers to the data entries are sent to the channel provider device. The channel system can be responsible for controlling the usage of one or more channels. The usage of such channel(s) can be controlled in part by the data entries. More specifically, the channel provider device accesses the data entries from the data and generates channel controls based on the values of the data entries. As explained herein above, the data entries define dependencies and include storage locations of the relevant content. The channel controls are set according to these values. Further, the data entries (or, more generally, the data store) can store user states, as described in connection with FIG. 5. For conditions that depend on interactions of end users and/or metrics about such interactions, the values in the user states are further used to set the channel controls.

At operation 616, the computer system receives data about the interactions of the end users with the channels and/or with content provided over the channels. The data is received from collection servers that monitor and track the interactions of the end users with the channels and/or with the content provided over the channels. Generally, the data identifies each end user responsible for an interaction(s), the channel at which the interaction occurred, the content with which the interaction was performed, and the marketing campaign. In an example, the data further identifies the interaction itself (e.g., the type of the interaction). In another example, the data includes metrics about the interactions (e.g., counts, averages, deviations, trends, regressions, etc.).

At operation 618, the computer system updates metrics in the data store about the usages of the channels. The metrics track the interactions of the end users per end user, per channel, and across the marketing campaign. In an example, the application applies statistical analysis to the received data to generate the metrics. Because the data identifies the end user, the channels, and the marketing campaign, different types of statistical analysis can be applied per user, per channel, and across the marketing campaign to generate the relevant metrics. The computer system can generate a report that visualizes the metrics and can provide the report to the computing device of the authorized user for presentation thereat.

At operation 620, the computer system maintains the end user states based on the data and/or metrics. For example, the application maintains, for each end user, a state. Any time a user interaction is detected or a metric about that user interaction is generated or updated, the application updates the relevant end user state. The end user states (or the updates thereto) are pushed or accessible to the channel systems, thereby allowing such systems to update the channel controls and refine the usages of the relevant channels based on the most up-to-date data from the end user states.

Figure 7:
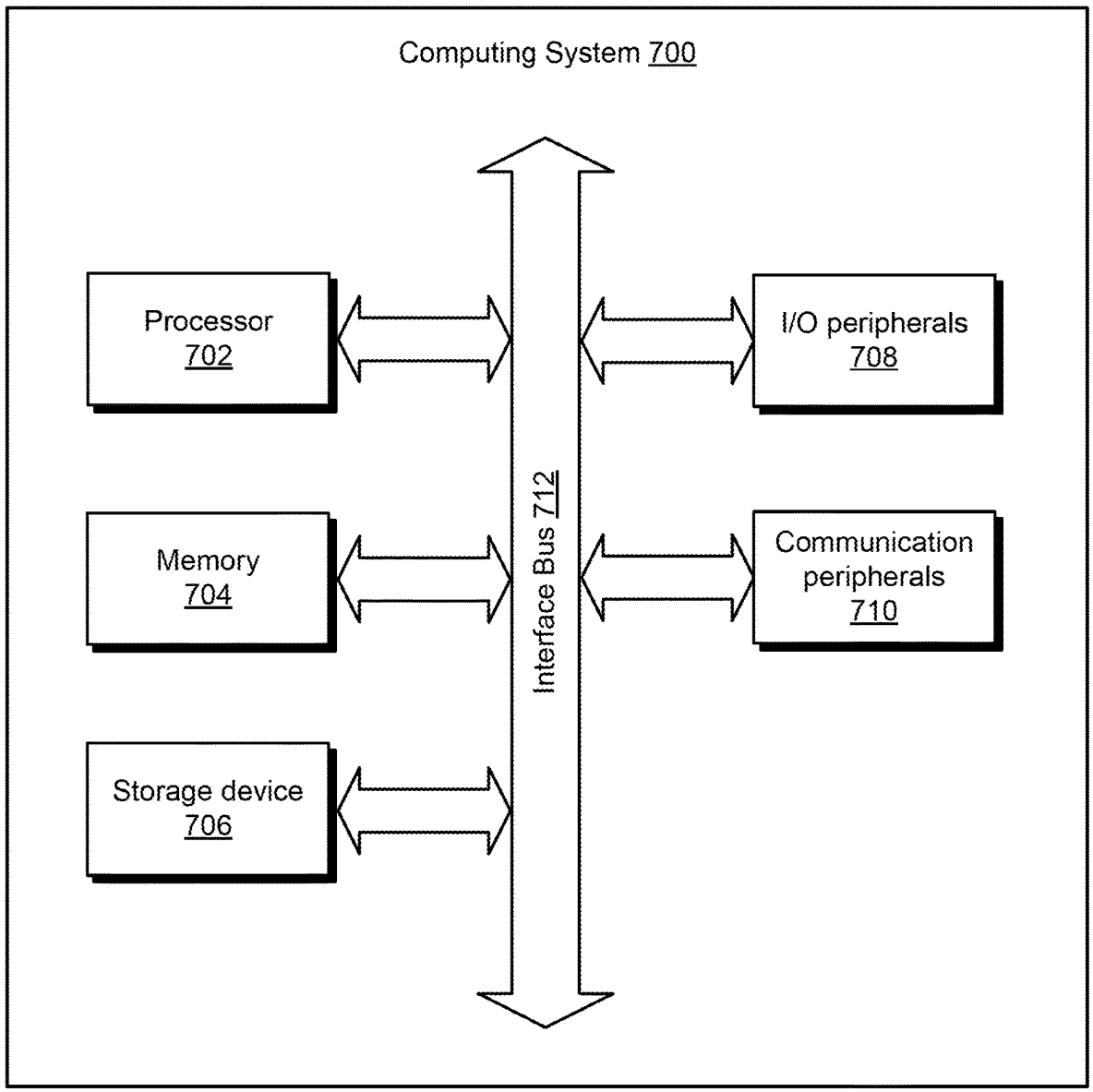
FIG. 7 illustrates examples of components of a computer system, according to certain embodiments.

FIG. 7 illustrates examples of components of a computer system 700, according to certain embodiments. The computer system 700 is an example of a system that hosts an application, a data store, and various interfaces for controlling usages of channels of a marketing campaign (or, more generally, a user experience ecosystem) as described in connection with FIGS. 1-6. Although these components are illustrated as belonging to a same computer system 700, the computer system 700 can also be distributed.

The computer system 700 includes at least a processor 702, a memory 704, a storage device 706, input/output peripherals (I/O) 708, communication peripherals 710, and an interface bus 712. The interface bus 712 is configured to communicate, transmit, and transfer data, controls, and commands among the various components of the computer system 700. The memory 704 and the storage device 706 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 704 and the storage device 706 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computer system 700.

Further, the memory 704 includes an operating system, programs, and applications. The processor 702 is configured to execute the stored instructions and includes, for example, a logical processing unit, a microprocessor, a digital signal processor, and other processors. The memory 704 and/or the processor 702 can be virtualized and can be hosted within another computing system of, for example, a cloud network or a data center. The I/O peripherals 708 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 708 are connected to the processor 702 through any of the ports coupled to the interface bus 712. The communication peripherals 710 are configured to facilitate communication between the computer system 700 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions, and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms, such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements, and/or steps are in any way required for one or more examples or that one or more examples necessarily include logic for deciding, with or without author input or prompting, whether these features, elements, and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A computer-implemented method comprising:
providing, by a computer system to a computing device, a user interface that is configured for setting up channels of a user experience ecosystem to be presented to a plurality of end users, wherein the computing device is associated with a user designing the user experience ecosystem;
generating, by the computer system, data entries based on operations of the user designing the user experience ecosystem in the user interface that is configured for setting up the channels of the user experience ecosystem, wherein the data entries identify the channels that form the user experience ecosystem;
causing, by the computer system, content for the channels of the user experience ecosystem to be generated by a content system based on the data entries and to be published by channel systems that are different from the content system in respective channels of the user experience ecosystem for presentation to the plurality of end users; and
updating, by the computer system, metrics about usages of the channels in the user experience ecosystem, wherein the metrics track interactions of the plurality of end users with the content published in the channels.

2. The computer-implemented method of claim 1, wherein the data entries are stored in a data store, the method further comprising:
adding, by the computer system to the data store, identifiers of storage locations of the content; and
providing, by the computer system, the channel systems with access to the data entries and the identifiers of the storage locations of the content for publishing the content in respective channels of the user experience ecosystem.

3. The computer-implemented method of claim 1, wherein the channels comprise a web channel and a social media channel.

4. The computer-implemented method of claim 1, wherein the data entries further specify dependencies between the usages of the channels, and wherein a usage of the channel by a channel system is coordinated with a usage of a different channel by a different channel system based on the dependencies specified in the data entries.

5. The computer-implemented method of claim 4, wherein the user interface comprises a canvas and a list of available channels, wherein the user interface supports a selection operation from the list of available channels to the canvas and a definition of the dependencies between the channels added to the canvas via selection operations, wherein the canvas supports a description of the content, and wherein the data entries are generated based on the channels added to the canvas, the definition of the dependencies, and the description of the content.

6. The computer-implemented method of claim 4, further comprising:
generating a set of rules based on the operations of the user in the user interface, wherein the set of rules define inter-channel conditions for the usage of the channel based on the interactions of the plurality of end users with the content published across the channels, and wherein the computer system stores the inter-channel conditions as the dependencies in the data entries.

7. The computer-implemented method of claim 6, wherein the usage of the channel is controlled at least in part by the inter-channel conditions and the metrics that track the interactions of the plurality of end users.

8. The computer-implemented method of claim 1, wherein the user interface comprises a first user interface (UI) element that supports user input identifying users that are responsible for the channels, wherein the user interface further comprises a second UI element that supports user input assigning privileges to the users, and wherein the computer system allows a particular user responsible for a particular channel to update a usage of the particular channel or a dependency associated with the particular channel via the user interface based on a privilege assigned to the particular user.

9. The computer-implemented method of claim 8, wherein the first UI element comprises a list of the users, wherein the computer system tracks a number of user experience ecosystems in which the particular user has been assigned channel responsibilities, and wherein the list identifies the particular user based on the number being below a threshold.

10. A system comprising:
a processing device; and
a non-transitory computer-readable medium communicatively coupled to the processing device, wherein the processing device is configured to execute program code stored in the non-transitory computer-readable medium and thereby perform operations comprising:
providing, to a computing device, a user interface that is configured for setting up channels of a user experience ecosystem to be presented to a plurality of end users, wherein the computing device is associated with a user designing the user experience ecosystem;
generating data entries based on operations of the user designing the user experience ecosystem in the user interface that is configured for setting up channels of the user experience ecosystem, wherein the data entries identify the channels that form the user experience ecosystem;
causing content for the channels of the user experience ecosystem to be generated by a content system based on the data entries and to be published by channel systems that are different from the content system in respective channels of the user experience ecosystem for presentation to the plurality of end users; and
updating metrics about usages of the channels in the user experience ecosystem, wherein the metrics track interactions of the plurality of end users with the content published in the channels.

11. The system of claim 10, wherein the data entries further specify dependencies between the usages of the channels, and wherein a usage of the channel by a channel system is coordinated with a usage of a different channel by a different channel system based on the dependencies specified in the data entries.

12. The system of claim 11, wherein the dependencies specify inter-channel conditions for the usage of the channel based on the interactions of the plurality of end users with content publications across the channels, and wherein a content publication via the channel is controlled based on the inter-channel conditions and user states that track the interactions of the plurality of end users per end user.

13. The system of claim 12, wherein the metrics identify, per end user, a user interaction with a particular channel, the particular channel, and a timestamp of the user interaction, and wherein the operations performed by the processing device further comprise maintaining a user state of an end user based on the metrics.

14. The system of claim 10, wherein the data entries are stored in a data store, and wherein the operations performed by the processing device further comprise:
- adding, to the data store, identifiers of storage locations of the content; and
- providing the channel systems with access to the data entries and the identifiers of the storage locations of the content for publishing the content in respective channels of the user experience ecosystem.

15. The system of claim 14, wherein an electronic platform hosts the data store and an application that provides the user interface, wherein the electronic platform provides access to the application to the user responsible for designing the user experience ecosystem and to users responsible for the channel systems, and wherein the application supports updates to the data entries from the users based on privileges assigned in the electronic platform to the users.

16. A non-transitory computer-readable storage medium having program code that is stored thereon, the program code executable by one or more processing devices for performing operations comprising:
- providing, to a computing device, a user interface configured for setting up channels of a user experience ecosystem to be presented to a plurality of end users, wherein the computing device is associated with a user designing the user experience ecosystem;
- generating data entries based on operations of the user designing the user experience ecosystem in the user interface that is configured for setting up channels of the user experience ecosystem, wherein the data entries identify the channels that form the user experience ecosystem;
- causing content for the channels of the user experience ecosystem to be generated by a content system based on the data entries and to be published by channel systems that are different from the content system in respective channels of the user experience ecosystem for presentation to the plurality of end users; and
- updating metrics about usages of the channels in the user experience ecosystem, wherein the metrics track interactions of the plurality of end users with the content published in the channels.

17. The non-transitory computer-readable storage medium of claim 16, wherein the data entries further specify dependencies between the usages of the channels, and wherein a usage of the channel by a channel system is coordinated with a usage of a different channel by a different channel system based on the dependencies specified in the data entries.

18. The non-transitory computer-readable storage medium of claim 17, wherein the dependencies specify time-based conditions or location-based conditions for the usage of the channel, and wherein a content publication via the channel is controlled based on the time-based conditions or the location-based conditions.

19. The non-transitory computer-readable storage medium of claim 16, wherein the data entries are stored in a data store according to a machine readable format that is common to the channel systems, and wherein the data store is accessible to channel systems and stores the data entries in association with an identifier of the user experience ecosystem.

20. The non-transitory computer-readable storage medium of claim 16, further comprising:
- updating a state of an end user based on the metrics, wherein the metrics comprises a first metric that indicates a user interaction of the end user with a first channel of the user experience ecosystem, wherein the metrics comprise a second metric that indicates a user interaction of the end user with a second channel of the user experience ecosystem, and wherein the updated state indicates a total interaction of the end user with the user experience ecosystem based on the first metric and the second metric.

* * * * *